(12) United States Patent
    Chakravarty

(10) Patent No.: US 9,578,031 B2
(45) Date of Patent: ***Feb. 21, 2017

(54) NON-INVASIVE METHOD AND SYSTEM FOR AUTOMATED ADMINISTRATION OF DIVERSE SECURITY CONSTRAINED SERVERS

(71) Applicant: HEWLETT PACKARD ENTERPRISE DEVELOPMENT LP, Houston, TX (US)

(72) Inventor: Srinath S. Chakravarty, Dallas, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 214 days.

This patent is subject to a terminal disclaimer.

(21) Appl. No.: 14/500,228

(22) Filed: Sep. 29, 2014

(65) Prior Publication Data
    US 2015/0020171 A1    Jan. 15, 2015

Related U.S. Application Data

(63) Continuation of application No. 11/057,103, filed on Feb. 11, 2005, now Pat. No. 8,849,960.

(51) Int. Cl.
    *G06F 15/16* (2006.01)
    *H04L 29/06* (2006.01)
    *G06F 21/31* (2013.01)

(52) U.S. Cl.
    CPC .............. *H04L 63/10* (2013.01); *G06F 21/31* (2013.01); *H04L 63/083* (2013.01); *Y10S 707/959* (2013.01)

(58) Field of Classification Search
    None
    See application file for complete search history.

(56) References Cited

U.S. PATENT DOCUMENTS

| 5,734,831 A | 3/1998 | Sanders |
| 5,898,835 A | 4/1999 | Truong |
| 6,789,112 B1 | 9/2004 | Freeman et al. |

(Continued)

FOREIGN PATENT DOCUMENTS

WO    2006088610    8/2006

OTHER PUBLICATIONS

PCT Notification of Transmittal of the International Search Report and the Written Opinion of the International Searching Authority, or the Declaration, for International Application No. PCT/US2006/002134, 14 pages.

(Continued)

*Primary Examiner* — Scott B Christensen
*Assistant Examiner* — Thomas Richardson
(74) *Attorney, Agent, or Firm* — Hewlett Packard Enterprise Patent Department

(57) ABSTRACT

A method of automatically administering servers is disclosed. The method includes automatically transmitting commands to at least one of the servers. Administrator level access is non-invasively obtained on the at least one of the servers utilizing the automatically transmitted commands. The at least one of the servers is administered using the administrator level access and the automatically transmitted commands.

20 Claims, 7 Drawing Sheets

(56) References Cited

U.S. PATENT DOCUMENTS

| | | | |
|---|---|---|---|
| 6,868,442 B1* | 3/2005 | Burdeau | H04L 69/329 709/223 |
| 7,020,706 B2 | 3/2006 | Cates et al. | |
| 7,069,553 B2* | 6/2006 | Narayanaswamy | G06F 8/61 717/173 |
| 7,207,039 B2* | 4/2007 | Komarla | G06F 9/4416 713/2 |
| 7,213,065 B2* | 5/2007 | Watt | G06F 9/4401 709/220 |
| 7,284,165 B2 | 10/2007 | Auvenshine et al. | |
| 7,373,654 B1 | 5/2008 | Reid | |
| 7,475,136 B2 | 1/2009 | Sinn | |
| 8,849,960 B2 | 9/2014 | Chakravarty | |
| 2005/0015503 A1* | 1/2005 | Edwiges | H04L 41/046 709/228 |
| 2006/0176884 A1* | 8/2006 | Fair | H04L 67/08 370/400 |
| 2006/0184649 A1 | 8/2006 | Chakravarty | |
| 2008/0039977 A1 | 2/2008 | Clark et al. | |

OTHER PUBLICATIONS

M. Lamoureux; "desmurfv. 1.3" (online); URL:http://web.archive.org/web/20040312163629/http://www.mitre.org/tech/cyber/DDOS/de smurftxt; XP-002385648; Dec. 6, 2006, 6 pages.

Cisco; "Improving Security on Cisco Routers" (online); URL:http://web.archive.org/web/20020124220415/http://www.cisco.com/warp/public/707 /21.html; XP-002385649; Jun. 13, 2006, 16 pages.

D. Libes; "Expect—A Tool for Automating Interactive Programs" (online); URL:http://web.archive.org/web/20040723112424/http:www.esrf.fr/computing/bliss/tclt k/expect/90min-introtalk.pdf, XP-002385650; Jul. 23, 2004, 23 pages.

D. Libes; "PASSMASS" (online); URL:http://web.archive.org/web/20040413083553/expect.nist.gov/example/passmass.man.html; XP-002385651; Dec. 6, 2006, 2 pages.

D. Libes; URL:http://web.archive.org/web/20040227213654/expet.nist.gove/example/passmass; XP-002385652; 4 pages.

Office Action for U.S. Appl. No. 11/057,103 mailed Sep. 4, 2008 (22 pgs.).

Office Action for U.S. Appl. No. 11/057,103 mailed Feb. 23, 2009 (17 pgs.).

Final Office Action for U.S. Appl. No. 11/057,103 mailed Aug. 13, 2009 (19 pgs.).

Office Action for U.S. Appl. No. 11/057,103 mailed Jan. 27, 2010 (14 pgs.).

Final Office Action for U.S. Appl. No. 11/057,103 mailed Jul. 9, 2010 (16 pgs.).

Examiner's Answer for U.S. Appl. No. 11/057,103 mailed Feb. 17, 2011 (17 pgs.).

Decision on Appeal for U.S. Appl. No. 11/057,103 mailed Apr. 2, 2014 (9 pgs.).

Notice of Allowance for U.S. Appl. No. 11/057,103 mailed Jun. 24, 2014 (12 pgs.).

* cited by examiner

NON-INVASIVE METHOD AND SYSTEM FOR AUTOMATED ADMINISTRATION OF DIVERSE SECURITY CONSTRAINED SERVERS

CROSS REFERENCE TO RELATED APPLICATIONS

This application is a continuation of U.S. patent application Ser. No. 11/057,103, entitled "NON-INVASIVE METHOD AND SYSTEM FOR AUTOMATED ADMINISTRATION OF DIVERSE SECURITY CONSTRAINED SERVERS," having a filing date of Feb. 11, 2005, which is herein incorporated by reference.

TECHNICAL FIELD OF THE INVENTION

This invention relates in general to server administration and, more particularly, to a non-invasive method and system for automated administration of diverse security constrained servers.

BACKGROUND OF THE INVENTION

In the software industry, centralized computer servers are the systems of choice for a great number of service providers, including application providers, web hosting services, database vendors, internet and firewall proxies, and 24.times.7 production environments. Some service providers maintain large data centers containing hundreds or thousands of server computers to host the data and/or application offered in their services. Within the maintenance of such data centers, security of data is a concern.

SUMMARY OF THE INVENTION

According to one embodiment of the invention, a method of automatically administering a plurality of servers includes automatically transmitting commands to at least one of the plurality of servers. Administrator level access is non-invasively obtained on the at least one of the plurality of the servers utilizing the automatically transmitted commands. The at least one of the plurality of the servers is administered using the administrator level access and the automatically transmitted commands.

Certain embodiments of the present invention may provide various technical advantages. For example, a technical advantage of one embodiment may include the capability to non-invasively, but intrusively administer remote servers. Other technical advantages of an embodiment of the invention may include the capability to increase efficiencies of administering security constrained servers.

While specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

It should be understood at the outset that although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
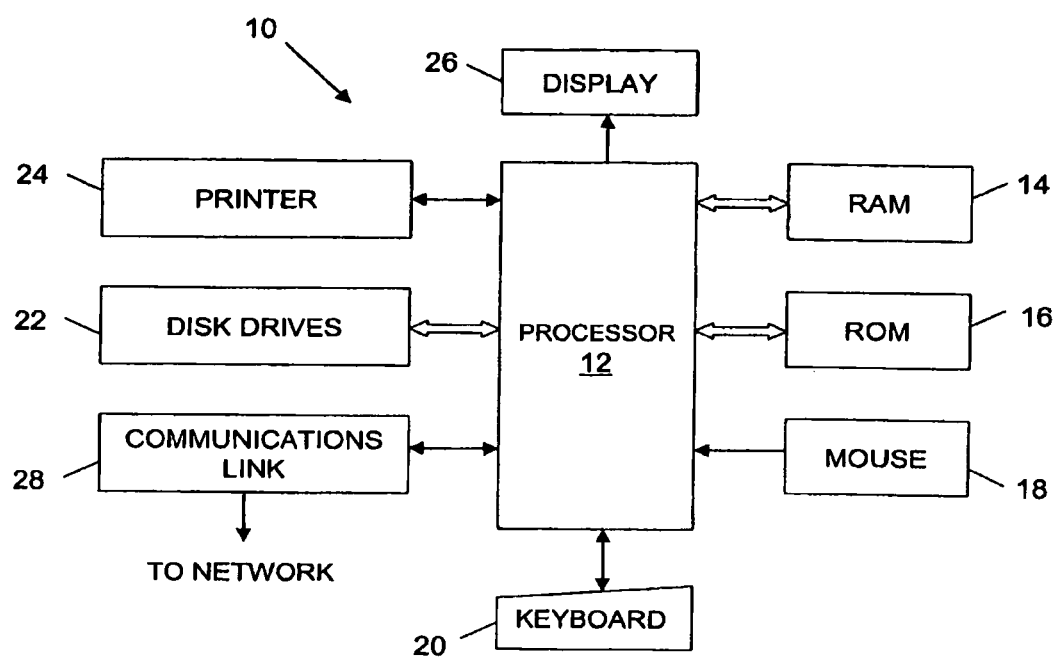
FIG. 1 is an embodiment of a general purpose computer that may be used in connection with one or more pieces of software employed by other embodiments of the invention.

FIG. 1 is an embodiment of a general purpose computer 10 that may be used in connection with one or more pieces of software employed by other embodiments of the invention. General purpose computer 10 may generally be adapted to execute any of the well-known OS2, UNIX, Mac-OS, Linux, and Windows Operating Systems or other operating systems. The general purpose computer 10 in this embodiment comprises a processor 12, a random access memory (RAM) 14, a read only memory (ROM) 16, a mouse 18, a keyboard 20 and input/output devices such as a printer 24, disk drives 22, a display 26 and a communications link 28. In other embodiments, the general purpose computer 10 may include more, less, or other component parts. Embodiments of the present invention may include programs that may be stored in the RAM 14, the ROM 16 or the disk drives 22 and may be executed by the processor 12. The communications link 28 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 22 may include a variety of types of storage media such as, for example, floppy disk drives, hard disk drives, CD ROM drives, DVD ROM drives, magnetic tape drives or other suitable storage media. Although this embodiment employs a plurality of disk drives 22, a single disk drive 22 may be used without departing from the scope of the invention.

Although FIG. 1 provides one embodiment of a computer that may be used with other embodiments of the invention, such other embodiments may additionally utilize computers other than general purpose computers as well as general purpose computers without conventional operating systems.

Additionally, embodiments of the invention may also employ multiple general purpose computers 10 or other computers networked together in a computer network. Most commonly, multiple general purpose computers 10 or other computers may be networked through the Internet and/or in a client server network. Embodiments of the invention may also be used with a combination of separate computer networks each linked together by a private or a public network.

Several embodiments of the invention may include logic contained within a medium. In the embodiment of FIG. 1, the logic comprises computer software executable on the general purpose computer 10. The medium may include the RAM 14, the ROM 16 or the disk drives 22. In other embodiments, the logic may be contained within hardware configuration or a combination of software and hardware configurations. The logic may also be embedded within any other suitable medium without departing from the scope of the invention.

Figure 2:
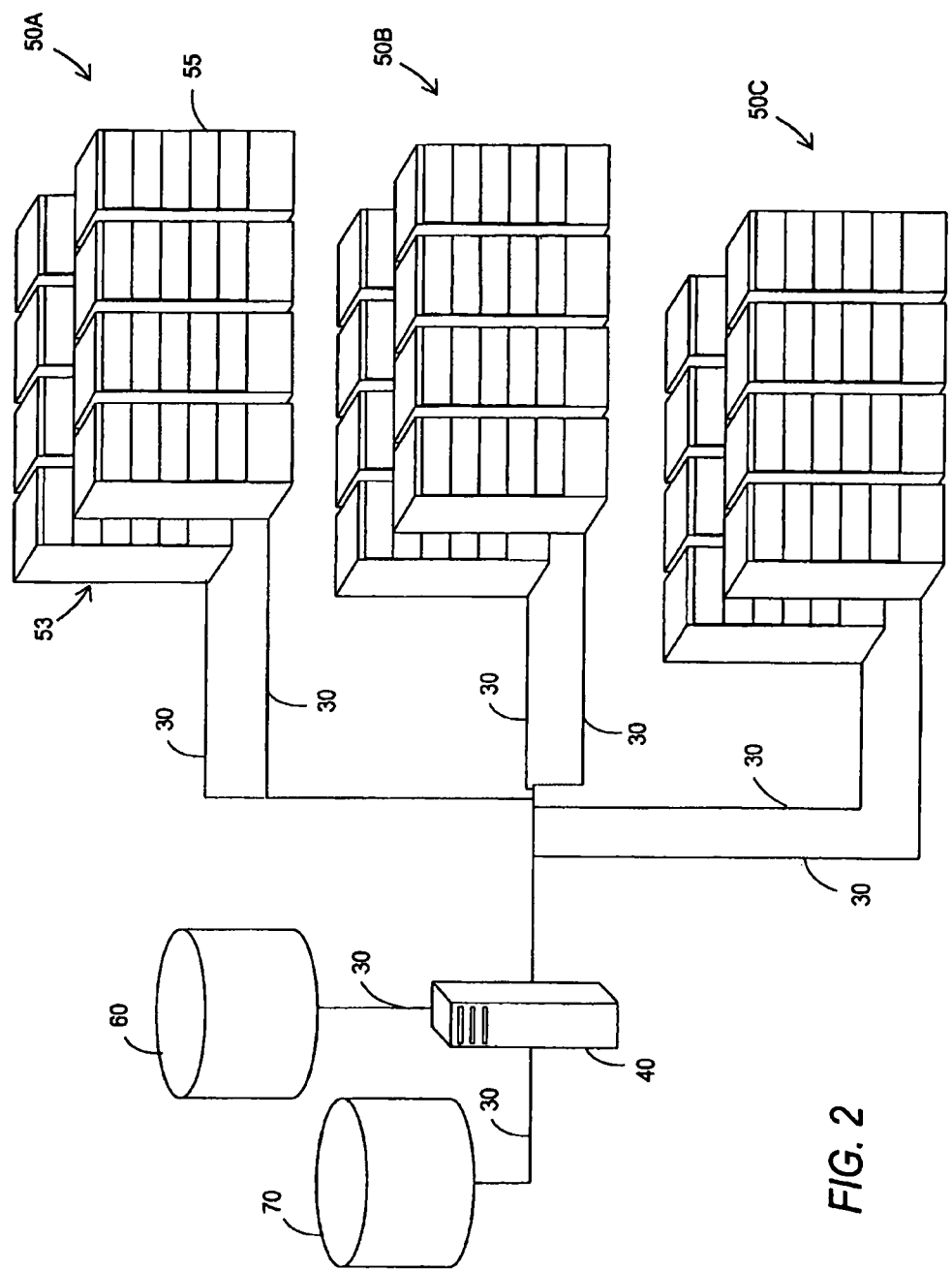
FIG. 2 is an embodiment of a computer and/or server in communication with sets of server towers.

FIG. 2 is an embodiment of a computer and/or server 40 in communication with sets 50A, 50B, and 50C of server towers 53. The computer and/or server 40 may be similar or different than the general purpose computer 10 described above with reference to FIG. 1. The computer and/or server 40 is shown in communication with an empirical command/response database 60 and a secure access management database 70. Details of the empirical command/response database 60 and the secure access management database 70 will be described below.

Each of the server towers 53 may generally store one or more servers 55. However, a server 55 may occupy an entire tower 53 or more than one tower 53. Additionally, a server 55 may span multiple sets 50A, 50B, and 50C and may be distributed in a variety of local or remote locations. In yet other embodiments, a variety of other architectural configurations for a server 55 may be utilized. Although three sets 50A, 50B, and SOC of server towers 53 and corresponding servers 55 are shown, more or less servers 55 and server towers 53 may be utilized in other embodiments. Additionally, while a general configuration of the computer and/or server 40 in communication with a server 55 is described in FIG. 2, other embodiments may utilize more, less, or alternative configurations.

As used in this document, "each" may refer to each member of a set or each member of a subset of a set.

The servers 55 and the empirical command/response database 60 and the secure access management database 70 may either be local or remote to the computer and/or server 40. Accordingly, communication links 30 may include a public or private data network; a local area network (LAN); a metropolitan area network (MAN); a wide area network (WAN); a wireline or wireless network; a local, regional, or global communication network; an optical network; a satellite network; an enterprise intranet; or other suitable communication links. In some embodiments, some or all of the communication links 30 may be a secure communication link.

The servers 55 may operate with a variety of different operating systems. For example, the servers may operate on Sun, HP, Dec, SGI, AIX, Linux, other UNIX "flavors" or other suitable operating systems. Additionally, the servers 55 may have a variety of different hardware configurations.

With such servers 55, a variety of administrative maintenance tasks may include, among others: root password change/management; account management, for example, account creation, removal, or maintenance; modifying files and configurations of servers; server compliance, including managing processes and files on servers; auditing to report inconsistencies; other administrative tasks; and combinations of the preceding. In administering any of these tasks, security may be an important factor. Among other items, the service provider utilizing the servers 55 may be required to ensure the confidentiality of data handled by their resident applications, prevent unauthorized access or intrusion for destructive purposes, and guard against malicious activities that may compromise application reliability and integrity. Standards governing security for each server 55 may be defined by a variety of sources, including client security specifications and the service providers, themselves.

The adoption of security practices may create difficult technical challenges for server administrators. As an illustrative example, tasks involved in access management/system administration of UNIX servers may only be performed by an administrator having a super-user (ROOT) privilege or a "root-like" privilege (which is still under the control of root). In other words, an administrator must sometimes gain root access to administer commands.

A further illustrative example may be seen with reference to invasive and intrusive processes. With regards to servers, "invasive" processes generally refer to an installation of an agent on a server operating system. The agent may take control of the server to varying extents (depending upon need) in order to perform administrative and/or other tasks. An "intrusive" process may generally refer to an action performed by an agent on a server—an "active" task (not "passive" as in reporting, auditing, etc.), which changes the present condition of the server. Several administrative tasks by definition are intrusive—changing the present state of the server. Security practice generally prescribes that intrusive maintenance procedures be conducted on a server, but in a non-invasive manner—in other words, without installation of agents on the server.

With the above boundaries in mind, service providers performing system administration on servers 55 frequently manually connect to a designated server 55. In these manual operations, the operator manually gains root access and then manually executes the required tasks—an intrusive, but non-invasive procedure.

Difficulties with such manual operations may arise when there is a need for uniformity and standardization of the administration procedures over the entirety of a secure data center server farm. Difficulties may arise due to the sheer number of servers 55 that may need to be administered. In some administration environments, the number of servers may be in the hundreds or thousands. Other difficulties may arise from the fact that various servers 55 utilize different operating systems or variations thereof (e.g., Sun, HP, Dec, SGI, Aix, and Linux), and that various servers have a variety of different access methods(e.g., firewall, telnet, SSH). The resultant product of the preceding difficulties may be a highly voluminous, disparate and complicated server administration problem.

Embodiments of the invention are directed towards a system that emulates human interaction with servers, providing a non-invasive, automated management of servers. In some embodiments such an automated management may be accomplished on operating systems that permit command-line administration and remote connectivity (such as, e.g., UNIX, VMS, OS/2, DOS).

Figure 3:
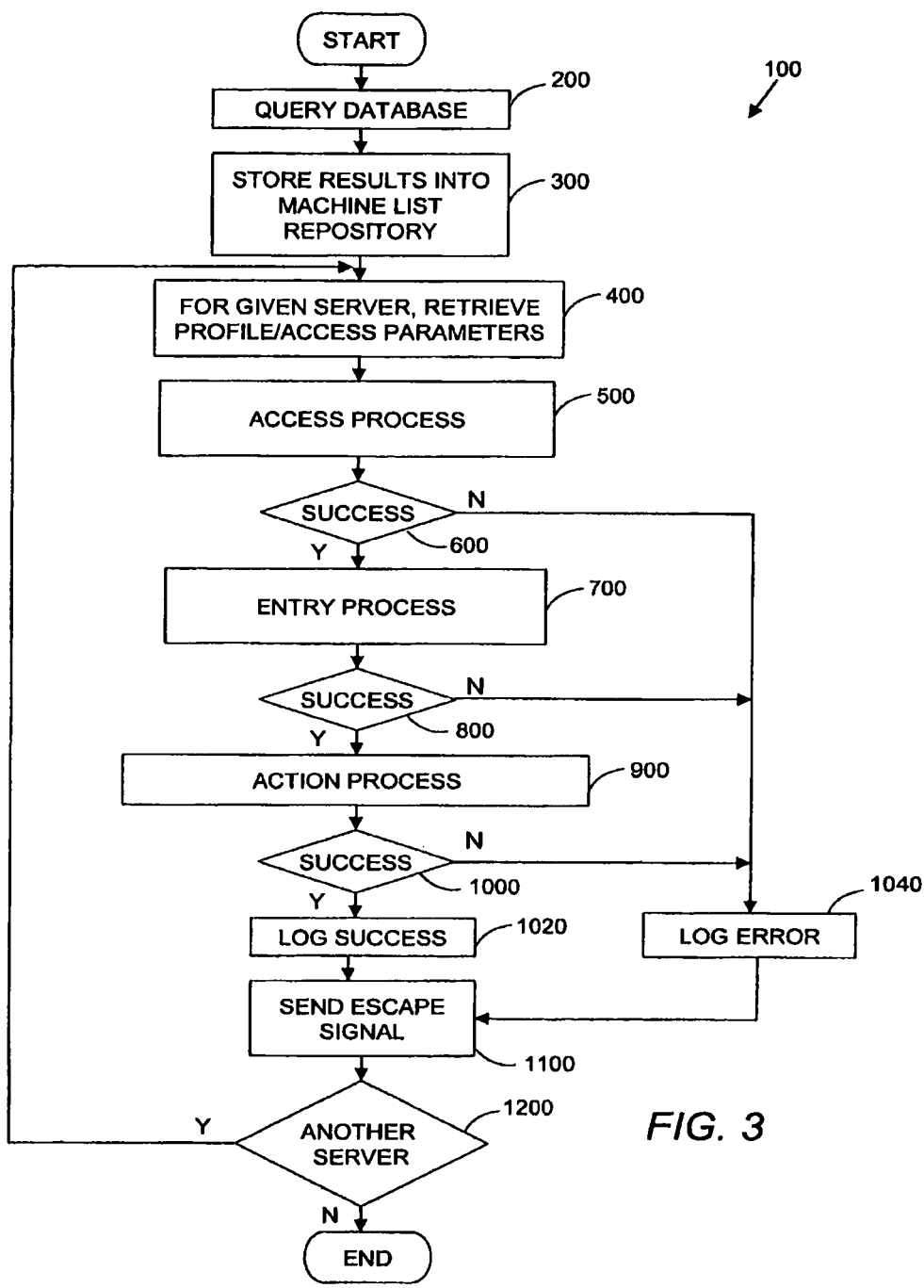
FIG. 3 is a process flow diagram for an embodiment of an automated management of servers.

FIG. 3 is a process flow diagram for an embodiment of the invention that may accomplish automated management of servers. With reference to FIGS. 2 and 3, a process 100 is illustrated. This process 100 in some embodiments may emulate a command line entry of information by a human operator. To facilitate this process 100 and any of the processes described below, any of a variety of different logic encoded in hardware, software, or both software and hardware may be utilized.

Upon commencement of the process 100, the secure access management database 70 may be queried at step 200. To facilitate security of such a query, a communication link 30 between the computer and/or server 40 obtaining information from the query and the secure access management database 70 may be secure (e.g., a secure link over a local area network). As referenced above, the computer and/or server 40 may either be either local or remote to the secure access management database 70. Accordingly, in some embodiments, a variety of authentication schemes may be utilized between the computer and/or server 40 and the secure access management database 70.

Among other items, the query may return information such as a list of machines or servers 55 to be processed, a location of each server 55 (e.g., IP addresses corresponding to the machines or servers 55), access methods for each respective machine or server 55 (e.g., particular protocol and/or operating system utilized by each server), entry parameters for each respective machine or server 55 (e.g., username and password information), and administrative actions to be performed on each machine or server 55 (e.g., root password changes/management; account management, for example, account creation, removal, or maintenance; modifying files and configurations of servers 55; server compliance involve managing processes and files on servers 55; auditing to report inconsistencies; other administrative tasks; and combinations of the preceding).

The results of the query may be stored on the computer and/or server 40 at step 300. The computer and/or server 40 may utilize this information in a variety of processing states within process 100, namely an access process 500, an entry process 700, and an action process 900. Further details of embodiments of these processes are described below with reference to FIGS. 4, 5, and 6 respectively.

The process 100 may gather information pertinent to taking a particular action for a particular designated server 55 at step 400 and initiate the access process 500 utilizing the information. Among other items, the access process 500 may result in a secure, approved, connection between the computer and/or server 40 and the designated server 55. Further details of an embodiment of an access process 500 are described below with reference to FIG. 4. The success of the access process 500 is reviewed at step 600. If the access process 500 is successful, the process 100 moves to the entry process 700. If the access process 500 is unsuccessful, the process 100 logs an error at step 1040.

In initiating the entry process 700, the process 100 may utilize another portion of the information pertinent to the designated server 55. Among other items, the entry process 700 may result in the computer and/or server 40 (1) "logging in" to the designated server and (2) gaining administrator access (e.g., root level access). Further details of an embodiment of an entry process 700 are described below with reference to FIG. 5. The success of the entry process 700 is reviewed at step 800. If the entry process 700 is successful, the process 100 may proceed to the action process 900. If the entry process 700 is unsuccessful, the process 100 may log an error at step 1040.

In initiating the action process 900, the process 100 may utilize yet another portion of the information pertinent to the designated server 55. Among other items, the action process 900 may result in the accomplishment of one or more administrative tasks. Further details of an embodiment of an action process 900 are described below with reference to FIG. 6. The success of the action process 900 is reviewed at step 1000. If the action process 900 is successful, the process 100 logs the success at step 1020. If the action process 900 is unsuccessful, the process 100 logs an error at step 1040. From the log error step 1040 and log success step 1100, the process may move to step 1100 where an escape signal is sent to disconnect from the designated server 55.

After disconnect from the designated server 55, a determination is made at step 1200 as to whether or not there are more servers 55 to process. If another server 55 needs to be processed, the process 100 loops back to step 400 to gather information pertinent to the next designated server 55 in the list. If no other servers 55 need to be processed, the process 100 ends. While illustration of the process 100 of FIG. 3 has generally been described as a serial processing technique, the process may also be initiated in a parallel manner.

Figure 4:
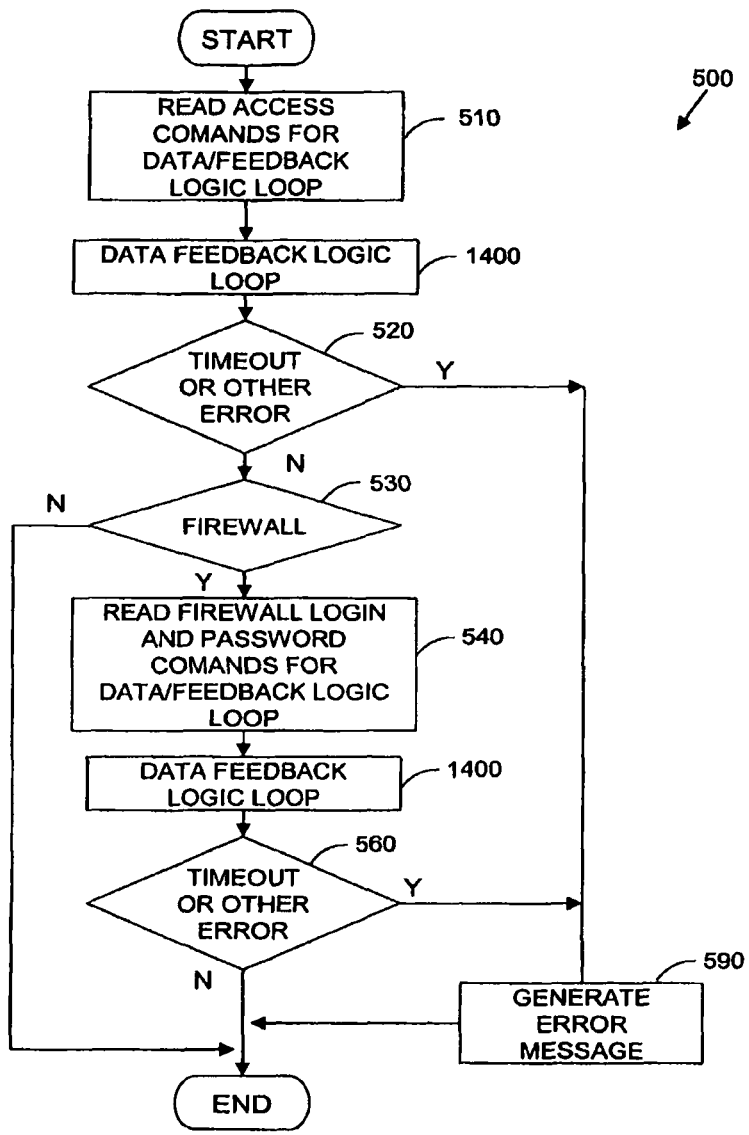
FIG. 4 is a process flow diagram for an embodiment of an access process.

FIG. 4 is a process flow diagram for an embodiment of an access process 500. Upon commencement of the access process 500, access commands for the designated server 55 may be read from the retrieved parameters of step 400 of FIG. 3 at step 510. Among other items, such access commands may include the Internet protocol (IP) address, a type of communication utilized in accessing the designated server 55 (e.g., SSH, Telnet, FTP, etc.), firewall login commands, and password commands. The access process 500 may enter this information into the data feedback logic loop process 1400. Further details of the data feedback logic loop process 1400 are discussed below with reference to FIG. 7.

The data feedback logic loop 1400 may generally use the information obtained from the access process 500 to engage in issuing commands to the server 55 and analyzing responses from the server 55 to determine the next appropriate command to issue. Among other goals, one goal of the data feedback logic loop 1400 in the access process 500 may be to gain access to the server 55.

After completing the data feedback logic loop process 1400, a determination may be made at step 520 to see if any errors or timeouts occurred in the data feedback logic loop process 1400. If an error or timeout occurred, the access process 500 may proceed to creation of an error log at step 590. If not, the access process 500 may determine if a firewall is present at step 530. If a firewall is not present, the access process 500 may end, having successfully gained access to the server 55. If a firewall is present, the appropriate firewall login and password commands may be fed into the data feedback logic loop process 1400, which similar to that descried above, engages in a command/response process to obtain access to the server 55 through the firewall.

The illustration of a firewall in this access process 500 of FIG. 4 is intended as illustrating that a variety of access schemes may be utilized in gaining access to servers. A variety of other authentication schemes may additionally be utilized in other embodiments. In such embodiments, the appropriate authentication parameters may be submitted to the server in the data feedback logic loop process 1400 of FIG. 7.

Figure 5:
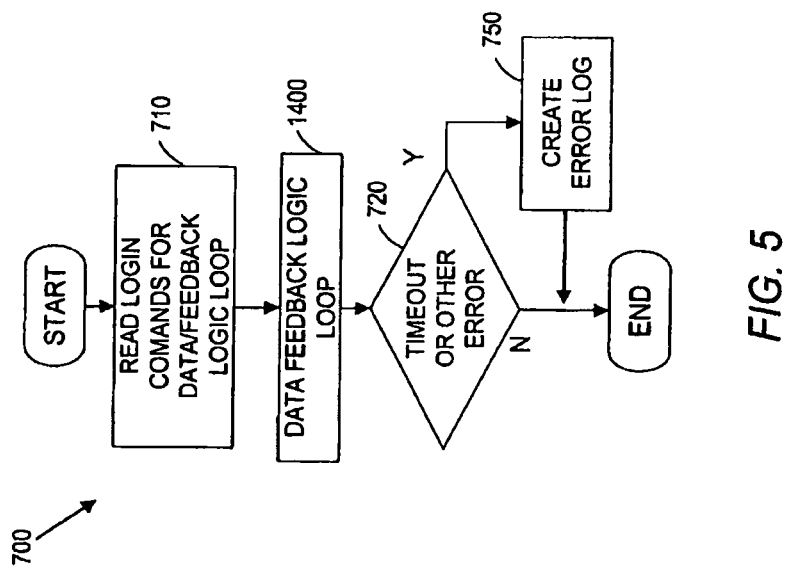
FIG. 5 is a process flow diagram for an embodiment of an entry process.

FIG. 5 is a process flow diagram for an embodiment of an entry process 700. Upon commencement of the entry process 700, the entry or login commands for the designated server 55 may be read from the stored list. Among other items, such entry or login commands may include the Internet protocol (IP) address and the login/passwords parameters to gain administrative access (e.g., root level access) to the server 55. The entry process 700 may feed this information into the data feedback logic loop process 1400.

Further details of the data feedback logic loop process 1400 are discussed below with reference to FIG. 7. In a manner similar to that described above, the data feedback logic loop process 1400 may generally use the information obtained from the entry process 700 to engage in issuing commands to the server 55 and analyzing responses from the server 55 to determine the next appropriate command to issue. Among other goals, one goal of the data feedback logic loop 1400 in the entry process 700 may be to log in to the server and gain administrative access.

After completing the data feedback logic loop process 1400, the entry process 700 may make a determination at step 720 to see if an error and/or time out occurred in the data feedback logic loop process 1400. If no time out or error occurred, the entry process 700 may end, having successfully gained administrator access. If a time out or error occurred, the entry process 700 may create an error log at step 750 and end the process.

Figure 6:
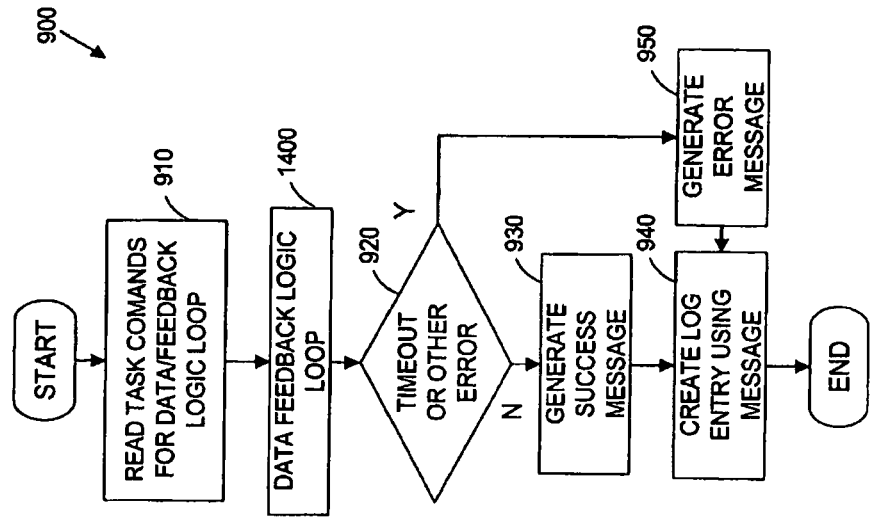
FIG. 6 is a process flow diagram for an embodiment of an action process.

FIG. 6 is a process flow diagram for an embodiment of an action process 900. At this point, the computer and/or server 40 via emulation of human interaction has preferably gained administrative access (e.g., root level access) to the designated server 500 (unless an error was presented in the preceding processing) and may begin the action process 900. Upon commencement of the action process 900, the action task commands for the designated server 55 may be read from the stored list at step 910. Among other items, such action task commands may include root password changes/management tasks; account management tasks (for example, account creation, removal, or maintenance); tasks which modify files and configurations of servers; server compliance tasks that involve managing processes and files on servers; auditing tasks which, among other items, may report inconsistencies; other administrative tasks; and combinations of the preceding. Further details of the data feedback logic loop process 1400 are provided below with reference to FIG. 7. Each of the administrative tasks are fed into instructions for data feedback logic loop process 1400. In a manner similar to that described above, the data feedback logic loop process 1400 may engage in a command/response process in attempts to successfully complete each of the administrative tasks fed to it.

After processing at the data feedback logic loop process 1400, the action process 900 reviews the success of each task at step 920. For each task, either an error message is created at step 950 or a success message is created at step 930. Logs are created of the messages at step 940 and the action process 900 is ended.

Figure 7:
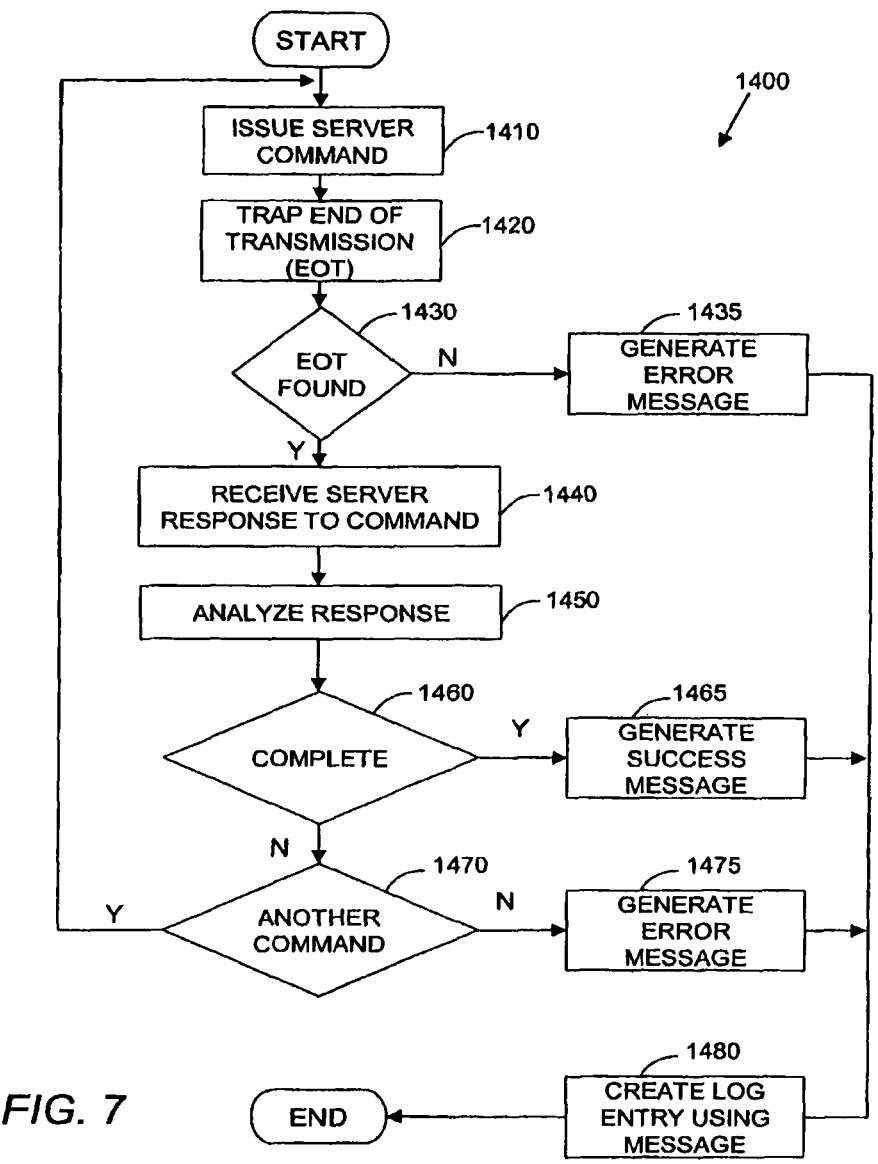
FIG. 7 is a process flow diagram for an embodiment of a data feedback logic loop process that may be utilized in various embodiments.

FIG. 7 is an embodiment of a process flow diagram for a data feedback logic loop process 1400 that may be utilized in various embodiments. The data feedback logic loop process 1400 of FIG. 7 may be fed a variety of information from other processes to perform specific task(s). For example, the access process 500 of FIG. 4 may feed information to the logic loop process 1400, concerning a gaining of access to a designated server 55; the entry process 700 of FIG. 5 may feed information to the logic loop process 1400, concerning gaining an entry or administrative access into the designated server 55; and the action process 900 of FIG. 6 may feed information, concerning actions or administrative tasks that need to be performed on the designated server 55.

Upon commencing the data feedback logic loop process 1400, a server command is issued at step 1410, based on the information provided to the feedback logic loop process 1400. In issuing this command, the computer and/or server 40 may be operating without knowing what responses will be received from the designated server 55. Accordingly, some embodiments may incorporate an asynchronous command and response scheme. In this asynchronous command and response scheme, the computer and/or server waits until all incoming data from the server 55 has completed transmission and traps the end of transmission (EOT) at step 1420.

A practical way of determining this EOT in connection modes where it may not be obvious, or where the computer and/or server 40 is unable to identify a specific EOT signal, is to initially read incoming transmission data and search the data for a "line feed" signal. Each linefeed signal may generally represent the termination of certain amount of transmitted data from the server, which is displayed as a single line of text on compatible terminals. Having identified the first linefeed, the computer and/or server 40 may continue reading the incoming transmission until the next linefeed is encountered. The process may be continued until there are no more linefeeds forthcoming in the data transmission. Such may be facilitated by "timing out" the incoming data while waiting for the next linefeed to appear—an indication that EOT has been reached.

This EOT technique works well for UNIX systems, because data transmissions in UNIX systems generally contain new line characters. Yet other techniques for determining an end of transmission may be used in other embodiments.

A determination is made at step 1430 as to whether or not the EOT has been found. Any timeout on incoming data transmissions prior to the very first linefeed represents an error in communication. If the EOT has been found, the feedback logic loop process 1400 may proceed to receipt of the server response at step 1440. If the EOT has not been found, the feedback logic loop process 1400 may proceed to step 1435 where an error message is created.

While not shown in FIG. 7, in some embodiments, an additional "retry" logical determination step may be incorporated prior to step 1435, which allows a number of attempts (up to a defined tolerance level) at trapping the EOT. Such a determination, for example, may loop the process back to step 1410 in reissuing the server command. Such a step may alternatively place a flag (e.g., along with the error message at step 1435) on the designated server 55 to try again at a later time if it determined that it may be beneficial to try the server 55 at a later time.

After the server response is received at step 1440, the response may be analyzed at a response analysis process 1450. To facilitate the response analysis process 1450, state and event awareness information may be passed along to the response analysis process 1450. For example, with regard to state awareness information, the feedback logic loop process 1400 may send information indicating that the response to be analyzed is one sent in response to a command sent in one of the above identified states of access (FIG. 4), entry (FIG. 5), or action (FIG. 6). With regard to event awareness information, the feedback logic loop process 1400 may send information concerning the last command sent, previous responses received, previous commands sent, or combinations of the preceding. More details of step 1450 are provided below with reference to FIG. 8. As detailed below, response analysis process 1450 may help to determine whether the particular task sought out in the data feedback logic loop process 1400 has been completed, and, if not, the next appropriate command that should be sent to the server 55. Accordingly, the data feedback logic loop process 1400 determines at step 1460 whether or not the task has been completed and at step 1470 determines whether or not another command should be issued.

If the task has been determined to have been completed at step 1460, the data feedback logic loop process 1400 may proceed to step 1465 where a success message is created, indicating that the task has been completed. If the task has not been completed, the data feedback logic loop process 1400 may proceed to step 1470 where a determination is made as to whether or not another command should be issued to the server 55. As briefly identified above, this determination, in part, may come from analyzing the response received at step 1450. If no other command is to be issued, the process may generate an error message at step 1475. If another command is to be issued, the data feedback logic loop process 1400 loops back to step 1410 to issue another server command.

Upon looping to step 1410 from step 1470, the input for the server command at step 1410 may come from the information gathered in analyzing the response at 1450. In some embodiments, the input may additionally come from the fact that another task needs to be initiated--for example, from the data initially fed to the process from the access process 500, entry process 700, or action process 900. Accordingly, the step 1470 may communicate with both the step 1450 (the analyzed response step) and the original input into the data feedback logic loop process 1400 to determine how to proceed. As an example, intended for illustrative purposes, several administrative tasks from the action process 900 of FIG. 6 may enter the data feedback logic loop process 1400. For each such administrative task, the data feedback logic loop process 1400 will be run—one after another (or in parallel if the server 55 allows such processing). In this illustrative example, a failure of the first administrative task will not necessarily prevent the remaining administrative tasks from being executed. For example, the first of three separate "add user" administrative tasks may fail; however, the other two tasks may still be processed. The determination of whether or not to continue processing the remaining tasks may be made at step 1470.

When another command is determined to be issued at step 1470 and the process loops back to step 1410, it may not be necessary to trap the EOT—such information already having been obtained. Accordingly, in some embodiments, step 1470 may be skipped in subsequent loops.

From the creation of messages at steps 1435, 1465, and 1475, the data feedback logic loop process 1400 may proceed to step 1480 where a log is created of each respective message from steps 1435, 1465, and 1475. Then, the data feedback logic loop process 1400 ends.

Figure 8:
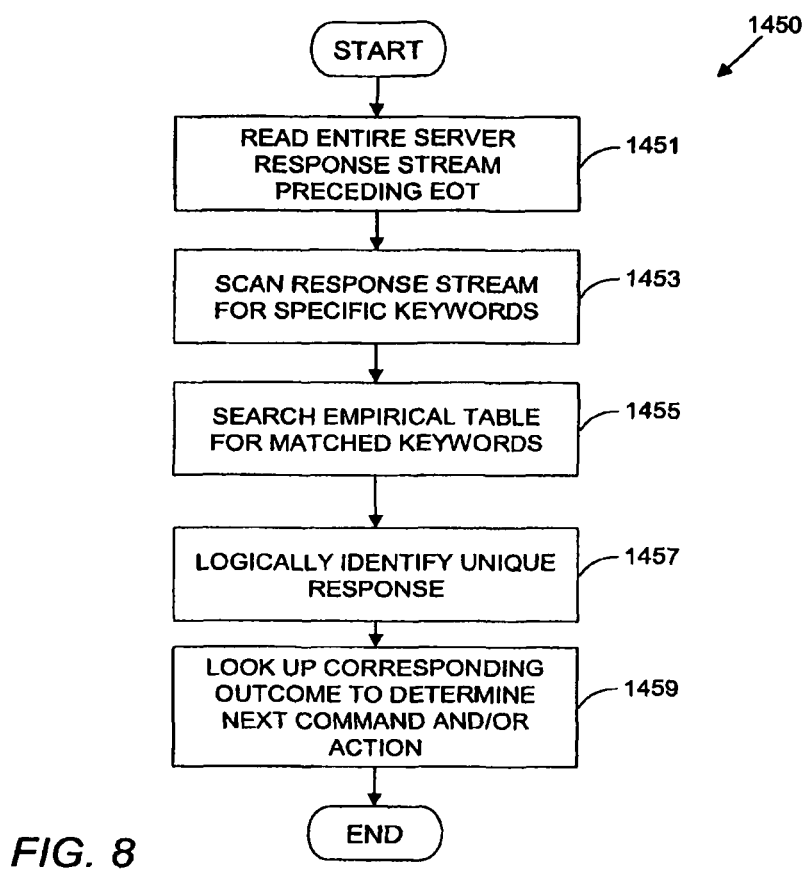
FIG. 8 is a process flow diagram of an embodiment of analyzing a server response with an empirical table.

FIG. 8 is a process flow diagram of an embodiment of a response analysis process 1450. The response analysis process 1450 may have state and event awareness of the information being fed to it. For example, with regards to state awareness, the response analysis process 1450 may recognize that it is analyzing a response from a command sent in one of the above identified states of access (FIG. 4), entry (FIG. 5), or action (FIG. 6). With regard to event awareness, the response analysis process 1450 may recognize the particular command events that were currently being attempted in each state. For example, the response analysis process 1450 may recognize in a state of entry (FIG. 5) that a login command was sent. Additionally, an event awareness may recognize that a previous sent login command in a previous login attempt was unsuccessful and that the current response being analyzed is a response to a subsequent login attempt. Thus, in some embodiments, event awareness may be a function of commands sent, responses received, other parameters, or combinations of the preceding.

State and event awareness may be accomplished in a variety of manners, including among others, utilizing data flags to identify the current process state and current command event and utilizing tables or database to keep track of the state and events. Accordingly, the response analysis process 1450 may analyze the server response according to an identified state and event.

The response analysis process 1450 begins at step 1451 by reading the entire server response stream preceding the EOT. Among other items, the server response may be represented as text, bytes, or packets. The response analysis process 1450 may sift through this response and scan the response stream for specific keyword(s) at step 1453. Using this keyword or keywords, an empirical table in the empirical command/response database 60 may be searched for matched keywords.

Logical operations may be applied at step 1457 to identify a unique response and to ensure there is no ambiguity over the exact response looked up in the empirical table. Such logical operations may include, among other items, an application of the identified state and event awareness to determine the command sent.

The outcome corresponding to the matched response may additionally be looked up to determine the next command and/or action at step 1459. Among the entries that may be found include the following: "ok", "error", or "no response found". Yet further information may additionally be included within the table to facilitate analyzing the server's response. Any of the preceding information may be fed into a decision process of other processes—e.g., steps 1460 and 1470 of FIG. 7. From step 1459, the response analysis process 1450 ends.

The above-referenced empirical table may be heuristically gathered based upon the results of manually testing the boundary conditions accompanying each issued command. It may additionally be based on preliminary results from testing the automated application itself.

In process 100 a variety of errors and/or successes are logged. Such logging facilitates administration of the servers 55. For example, using the logs, a determination may be made as to which administrative tasks were completed successfully and as to which administrative tasks were not completed successfully. For those administrative task that were not successfully completed, a determination may be made as to which state and/or event an error or timeout occurred—for example, at the access, entry, or action state. If the error was due to a lack of an entry in the empirical table on the empirical command/response database 60, the error may be analyzed and a new entry may be added to the empirical table, thereby enhancing the empirical table. Yet other errors may be investigated to determine the cause of the error. A variety of measures may be taken for administrative tasks that were not completed successfully, including resubmitting the task for processing.

As briefly referenced above, the process 100 may be accomplished in parallel or serial fashions, utilizing one or more computers and/or servers 40. Parallel processing may provide efficiencies in some embodiments. For example, in some embodiments, several quicker responding servers 55 may be processed while waiting on a slower responding server 55 to issue a response.

From the above, it may be seen that the process 100 in some embodiments may operate in a non-invasive manner, obtaining command-line access to administer intrusive commands to the server 55. With the general description of the process flow diagrams above, it should be understood that a variety of changes to such process flow diagrams may be made to facilitate the process, some of such changes which were identified above. Yet other modifications may be made.

Numerous other changes, substitutions, variations, alterations, and modifications may be ascertained to one skilled in the art and it is intended that the present invention encompass all such changes, substitutions, variations, alterations, and modifications as falling within the scope of the appended claims.

To aid the Patent Office, and any readers of any patent issued on this application in interpreting the claims appended hereto, applicants wish to note that they do not intend any of the appended claims to invoke 6 of 35 U.S.C. §112 as this paragraph and section exists on the date of filing hereof unless "means for" or "step for" are used in the particular claim.

The invention claimed is:

1. A computerized method of automatically administering a plurality of servers, the computerized method comprising:
   automatically transmitting, with computer executing logic contained on a medium, a first set of the commands to the at least one of the plurality of servers, wherein the first set of the commands includes access commands configured to gain secure access to the at least one of the plurality of servers;
   automatically and non-invasively obtaining, with the computer executing logic contained on the medium, administrator level access on the at least one of the plurality of the servers using the first set of automatically transmitted commands;
   automatically transmitting, with the computer executing logic contained on the medium, a second set of the commands to the at least one of the plurality of servers wherein the second set of the commands include action commands configured to perform administrative tasks on the at least one of the plurality of servers; and
   intrusively administering the at least one of the plurality of the servers, with the computer executing logic contained on the medium and an agent installed on the at least one of the plurality of servers, using the administrator level access and the second set of automatically transmitted commands.

2. The method of claim 1, wherein the administrator level access is a root level access.

3. The method of claim 1, wherein the administering the at least one of the plurality of the servers includes changing a root level password with the computer executing logic contained on the medium and the agent installed on the at least one of the plurality of servers.

4. The method of claim 1, comprising querying a storage device, with the computer executing logic contained on the medium, for information relating to profile and access parameters for the plurality servers,
   wherein a resultant list obtained from the querying at least partially determines which sets of commands will be automatically transmitted to at least one of the plurality of servers, and
   wherein the storage device is remote from the plurality of servers.

5. The method of claim 1, wherein the second set of automatically transmitted commands include entry commands and action commands, further comprising:
   utilizing the entry commands, with the computer executing logic contained on the medium, to gain administrator level access to the at least one of the plurality of servers with login commands; and
   utilizing the action commands, with the computer executing logic contained on the medium and the agent installed on the at least one of the plurality of servers, to intrusively administer the at least one of the plurality of servers.

6. The method of claim 5, wherein for the transmittal of each of the access commands, entry commands, and action commands the method further comprises:
   receiving, with the computer executing logic contained on the medium, a response from the at least one of the plurality of servers;
   searching, with the computer executing logic contained on the medium, the response for at least one keyword;
   cross-referencing, with the computer executing logic contained on the medium, the at least one keyword with an empirical table; and
   determining, with the computer executing logic contained on the medium, a next command to transmit to the at least one of the plurality of servers based at least partially upon an entry cross-referenced with the at least one keyword.

7. The method of claim 5, wherein for the transmittal of each of the access commands, entry commands, and action commands the method further comprises:
   receiving, with the computer executing logic contained on the medium, a response from the at least one of the plurality of servers;
   searching, with the computer executing logic contained on the medium, the response for at least one keyword;
   cross-referencing, with the computer executing logic contained on the medium, the at least one keyword with an empirical table; and
   determining, with the computer executing logic contained on the medium, a next command to transmit to the at least one of the plurality of servers based at least partially upon an entry cross-referenced with the at least one keyword and state and event awareness information.

8. The method of claim 1, wherein the non-invasively obtaining administrator level access on the at least one of the plurality of the servers includes:
   receiving, with the computer executing logic contained on the medium, a response from the at least one of the plurality of servers;
   searching, with the computer executing logic contained on the medium, the response for at least one keyword;
   cross-referencing, with the computer executing logic contained on the medium, the at least one keyword with an empirical table; and
   determining, with the computer executing logic contained on the medium, a next command to transmit to the at least one of the plurality of servers based at least partially upon an entry cross-referenced with the at least one keyword.

9. A computer network administration system, comprising:
   a non-transitory computer readable storage medium; and
   software stored on the non-transitory computer readable storage medium, the software, when executed by a processor, to cause the processor to:
   query a database for information relating to profile and access parameters for a plurality of servers, wherein a resultant list obtained from the querying at least partially determines which set of commands will be automatically transmitted to at least one of the plurality of servers wherein the database is remote from the plurality of servers;
   automatically transmit a first set of the commands to the at least one of the plurality of servers, wherein the first set of the commands includes access commands configured to gain secure access to the at least one of the plurality of the servers;

non-invasively obtain administrator level access on the at least one of the plurality of the servers using the first set of automatically transmitted commands;

automatically transmit a second set of the commands to the at least one of the plurality of servers, wherein the second set of the commands include action commands configured to perform administrative tasks on the at least one of the plurality of servers; and intrusively administer, with an agent installed on the at least one of the plurality of servers, the at least one of the plurality of the servers using the administrator level access and the second set of automatically transmitted commands.

10. The computer network administration system of claim 9, wherein the administrator level access is a root level access.

11. The computer network administration system of claim 9, wherein the software to cause the processor to administer the at least one of the plurality of the servers causes the processor to change a root level password.

12. The computer network administration system of claim 9, wherein the plurality of servers includes a plurality of diverse security constrained servers.

13. The computer network administration system of claim 9, wherein the second set of automatically transmitted commands include entry commands and action commands, and the software is further to cause the processor to:

utilize the entry commands to gain administrator level access to the at least one of the plurality of servers with login commands; and utilize the action commands to intrusively administer the at least one of the plurality of servers.

14. The computer network administration system of claim 13, wherein the software to cause the processor to transmit each of the access commands, entry commands, and action commands is to cause the processor to:

receive a response from the at least one of the plurality of servers;

search the response for at least one keyword;

cross-reference the at least one keyword with an empirical table; and determine a next command to transmit to the at least one of the plurality of servers based at least partially upon an entry cross-referenced with the at least one keyword.

15. The computer network administration system of claim 13, wherein the software to cause the processor to transmit each of the access commands, entry commands, and action commands is to cause the processor to:

receive a response from the at least one of the plurality of servers;

search the response for at least one keyword;

cross-reference the at least one keyword with an empirical table; and determine a next command to transmit to the at least one of the plurality of servers based at least partially upon an entry cross-referenced with the at least one keyword and state and event awareness information.

16. The computer network administration system of claim 9, wherein the software to cause the processor to non-invasively obtain administrator level access on the at least one of the plurality of servers is to cause the processor to:

receive a response from the at least one of the plurality of servers;

search the response for at least one keyword;

cross-reference the at least one keyword with an empirical table; and determine a next command to transmit to the at least one of the plurality of servers based at least partially upon an entry cross-referenced with the at least one keyword.

17. A computerized method of automatically administering a plurality of diverse servers, the computerized method comprising:

querying, with a computer executing logic contained on a medium, to at least partially determine which sets of commands to automatically transmit to at least one of the plurality of servers;

automatically transmitting, with the computer executing logic contained on the medium, a first set of the commands to the at least one of the plurality of servers, wherein the first set of the commands includes access commands configured to gain secure access to the at least one of the plurality of servers;

automatically and non-invasively obtaining, with the computer executing logic contained on the medium, administrator level access on the at least one of the plurality of the servers using the first set of automatically transmitted commands;

automatically transmitting, with the computer executing logic contained on the medium, a second set of the commands to the at least one of the plurality of servers wherein the second set of the commands include action commands configured to perform administrative tasks on the at least one of the plurality of servers; and intrusively administering the at least one of the plurality of the servers, with the computer executing logic contained on the medium and an agent installed on the at least one of the plurality of servers, using the administrator level access and the second set of automatically transmitted commands.

18. The method of claim 17, wherein the administrator level access is a root level access.

19. The method of claim 17, wherein the querying includes querying a storage medium remote from the plurality of servers.

20. The method of claim 17, wherein the administering the at least one of the plurality of the servers includes changing a root level password with the computer executing logic on a medium and the agent installed on the at least one of the plurality of servers.

* * * * *